United States Patent Office.

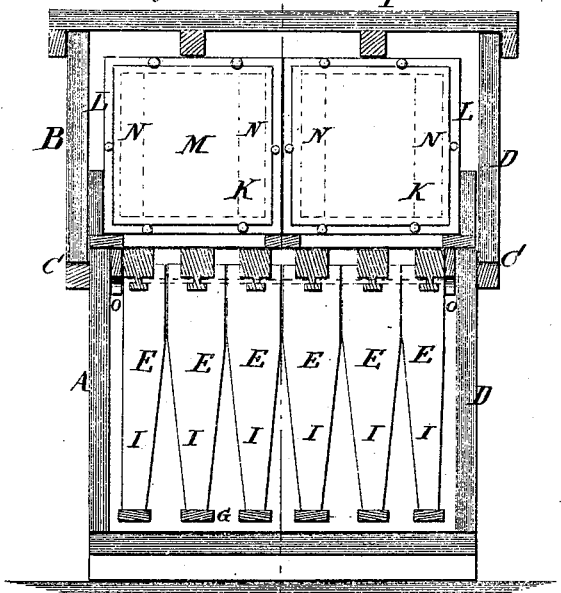
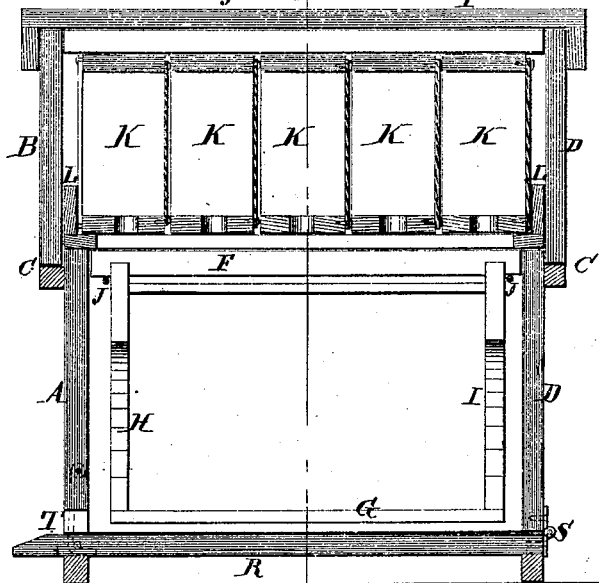

GEORGE T. WHEELER, OF MEXICO, NEW YORK.

Letters Patent No. 109,477, dated November 22, 1870.

IMPROVEMENT IN BEE-HIVES.

The Schedule referred to in these Letters Patent and making part of the same.

*To all whom it may concern:*

Be it known that I, GEORGE T. WHEELER, of Mexico, in the county of Oswego and State of New York, have invented a new and useful Improvement in Bee-Hives; and I do hereby declare that the following is a full, clear, and exact description thereof, which will enable others skilled in the art to make and use the same, reference being had to the accompanying drawing forming part of this specification.

My invention relates to bee-hives, and has two specific purposes in view:

The first is to secure the comb-frames firmly, but detachably, in the lower part of the hive.

The novel means which I combine to effect this purpose are three in number, and consist in suspending the frame, tapering the sides thereof, and fastening with removable keys.

The second purpose is to overcome a difficulty in making honey for market, which is well understood by all engaged in the business, and which seems to have, hitherto, baffled their ingenuity to overcome.

This difficulty is, that bees will work better, and make a much greater quantity of honey, in large boxes than in small ones, while small ones will sell at a price thirty per cent. higher in the market.

My object, then, is to make them do the maximum of work in the minimum of boxes.

This object I accomplish by making the boxes small, but communicable, on each side of tin-slip partitions.

Thus, they are made to be conscious of and appreciate the magnitude of the chamber, while the tin slips answer all the purposes of dividing the honey into practically small boxes, which are separately removable.

In the accompanying drawing—

Figure 1 is a vertical section through the hive, on line *x x* of fig. 2.

Figure 2 is a vertical section of fig. 1, on the line *y y*.

Similar letters of reference indicate corresponding parts.

This hive is made in two parts, A being the lower and B, the upper part, which are made to be separated at the line C.

D represents the outer walls of the hive.

E represents the comb-frames, which are arranged in the lower part of the hive, as represented.

These frames are each composed of a main horizontal rail, F, a lower rail, G, parallel therewith, and two vertical pieces, H and I, connected together in any durable manner.

The frames thus made are suspended by the projecting ends of the rail F, on the wires J, which wires are stretched across the hives.

The frames are made to occupy each its proper position, as, by the width of the tapering pieces H I and keys O, they are brought in contact with each other in their upper, as seen in the drawing.

K represents a series of honey-boxes, arranged in an open, shallow frame, L, in the upper portion of the hive.

These boxes communicate with the lower portion of the hive, by means of apertures in their bottoms, and the boxes of each tier, or row are in communication with each other, being separated only by pieces of tin, M, indicated in dotted lines in fig. 1, leaving openings N on each side.

The outside boxes are closed on their outer sides by glass plates, so that when the upper portion B of the hive is removed the bees and the honey will be secure in the boxes, while any single box may be removed without disturbing the rest, and an empty box may be put in its place.

To remove the frames one or both of the keys O will be removed.

These keys serve to keep the frames tight in their places.

P is the cap or cover of the hive, which is fitted onto the part B, so that it is readily removed.

R is the floor or platform of the hive, to which is hinged the lower part A, as seen at S.

T represents the bee-entrance.

By this mode of connecting the hive, and arranging and securing the honey-frames and boxes, the yield of the bees is greatly increased, and the trouble incident to the care of bees and securing their honey is much diminished.

Having thus described my invention,

I claim as new and desire to secure by Letters Patent—

1. A detachable comb-frame, having the sides tapering from about midway to the bottom, a straight portion being left at the top to co-operate with the removable keys, as and for the purpose described.

2. The honey-boxes K K K, arranged in rows and communicating with one another on each side of slips M, combined with a shallow detachable frame L, for the purpose described.

GEORGE T. WHEELER.

Witnesses:
JOHN C. TAYLOR,
GEORGE W. STONE.